May 29, 1962 L. E. MENDOZA ET AL 3,037,072

PORTABLE TELEVISION SYSTEM

Filed Oct. 24, 1958 3 Sheets-Sheet 1

Lorenzo E. Mendoza
Roberto J. de los Rios
INVENTORS

BY Clarence A. O'Brien
and Harvey B. Jacobson
Attorneys

Lorenzo E. Mendoza
Roberto J. de los Rios
INVENTORS

BY Clarence A. O'Brien
and Harvey B. Jacobson
Attorneys

PORTABLE TELEVISION SYSTEM

Filed Oct. 24, 1958 3 Sheets-Sheet 3

Lorenzo E. Mendoza
Roberto J. de los Rios
INVENTORS

BY Clarence A. O'Brien
and Harvey B. Jacobson
Attorneys

United States Patent Office 3,037,072
Patented May 29, 1962

3,037,072
PORTABLE TELEVISION SYSTEM
Lorenzo E. Mendoza and Roberto J. de los Rios, both of 310 E. Adalle, Tampa, Fla.
Filed Oct. 24, 1958, Ser. No. 769,443
4 Claims. (Cl. 178—5.8)

This invention relates to portable television projection and direct view systems and more particularly to a portable television receiver capable of projecting an image onto a screen in order to have a considerably larger image.

An object of the invention is to provide a television receiver wherein the picture tube is separate from the television receiver chassis, connected only by a cable to conduct the necessary audio and video signals to the picture tube and speaker. The picture tube is mounted in a casing with the casing carried by a base by means of a bracket assembly constructed in a manner to enable the picture tube casing to be tilted about intersecting axes and maintained in a selected adjusted position so that the projected image may be directed in essentially any direction to suit the convenience of the user.

Although the invention discloses improvements in the arrangement of circuits, the selectivity of circuit arrangements to obtain the versatility inherent in the television receiver-projector leads to a further object of the invention which is the provision of structural improvements in the casing, base and means connecting the casing to the base so that the audio section of the television set may be maintained with a speaker outlet adjacent to the picture tube, even though the chassis of the television receiver is remotely located. In connection with the audio section of the television receiver, there are means by which to plug in an earphone, small portable speaker or a like instrument so that the sound may be delivered adjacent to the picture tube or at a location remote from the picture tube. This latter feature is important in hospitals or other places where quiet listening is often essential.

Although projection television systems have been used in the past, a system constructed in accordance with this invention enables a conventional picture tube to be used as the image source, magnified and projected onto a screen surface. When converting from a direct view picture tube to a projection tube it is preferred that a smaller tube be used so that the configuration of the instrument may be maintained as small as possible and for the further reason that greater light intensity can be obtained in a smaller tube, this being more suitable for a projection system.

When directly viewing a picture image on the phosphor screen of a cathode ray tube, kinescope or any other type of picture tube, the image is oriented properly both from left to right and in a vertical direction. However, if the image were directly projected onto a screen, and that image were magnified by a conventional magnification lens, the picture would appear vertically inverted and horizontally inverted. This invention provides several alternate means for correcting this difficulty.

In one phase of the invention the deflection yoke is inverted thereby vertically inverting the image on the phosphor screen of the picture tube. Secondly, the horizontal deflection signal input wires are exchanged and this has the result of horizontally inverting the image on the phosphor screen of the television tube. Then, an ordinary magnification lens or lens system may be interposed between the phosphor screen of the television receiver tube and a screen so that when the image is viewed on the screen it is both vertically and horizontally oriented correctly.

Another phase of the invention would achieve the same result by a double convex lens, leaving the yoke in its original position, but exchanging the horizontal deflection signal input wires. The double convex lens vertically inverts the image, and the horizontal inversion is accomplished by exchanging the horizontal deflection signal input leads or wires.

A further adaptation of the invention employs a light funnel by which the lens system is supported. The light funnel is disposed at the front of the television picture tube, with one of the lenses being a plano-convex lens which reduces the image in a short distance without varying the position and transmits the image to a projection lens.

In the event that it is desired to project the image onto a translucent screen while using a double convex lens, the correct position of the image is obtained by inverting the deflection yoke and leaving the horizontal deflection signal input wires in their correct position. The double convex lens inverts the image and makes it possible to view the image through a translucent glass or other like substance screen in the proper position. In this arrangement a person viewing the image will be located on one side of the translucent screen, and the image will be projected onto the opposite side of the screen.

The system may be used with or as a part of any electronic instrument that has an image screen, e.g. an oscilloscope or a fluoroscope where enlargement of the image is desired. Such instruments are found in many places. One example is in radiology where the radiologist may be in front of the image and protected from radiation by a lead shield. With this system he may be behind the image producing fluoroscope and observe an enlarged reproduction projected onto a screen and omit the lead shield.

Other objects, features and changes such as the inclusion of an optical prism may be resorted to.

Figures 1, 2, 9:
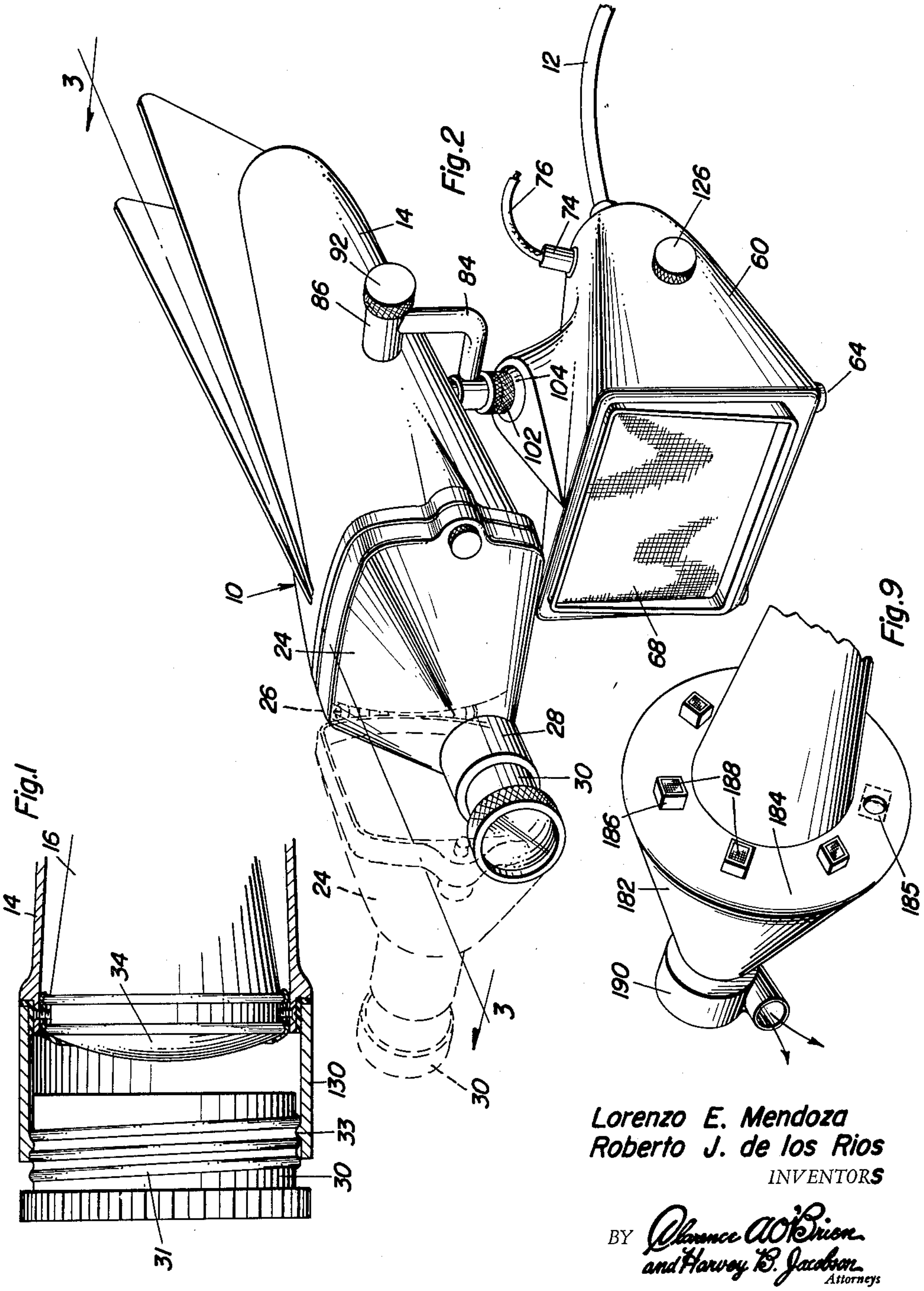
FIGURE 1 is a fragmentary sectional view of the system.
FIGURE 2 is a perspective view of a modification.
FIGURE 9 is a perspective view of another modification.
Figure 3:
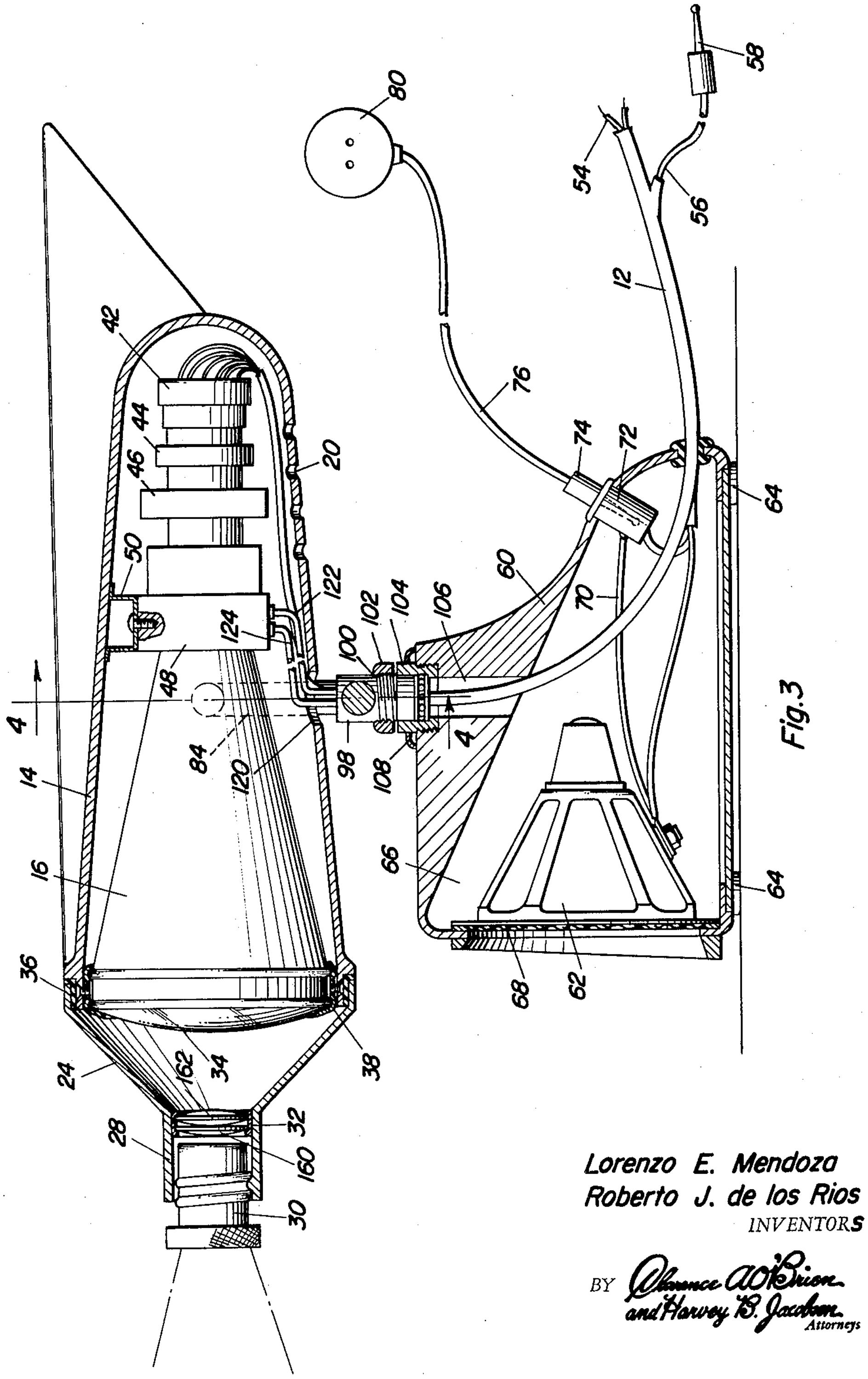
FIGURE 3 is a sectional view taken on the line 3—3 of FIGURE 2.
Figure 4:
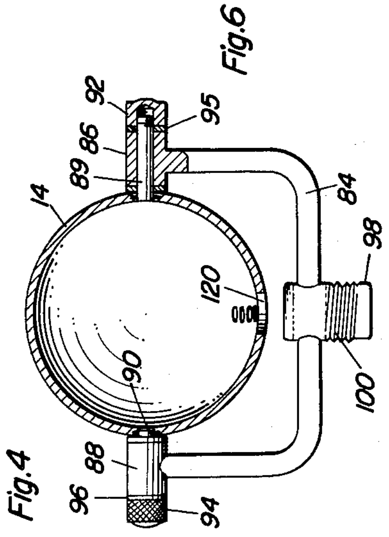
FIGURE 4 is a sectional view taken on the line 4—4 of FIGURE 3.

In the accompanying drawings there is a television receiver 10, the chassis thereof being conventional and not shown. The chassis may be located at, near or remote from the receiver 10, there being only a single cable 12 required to connect with the audio and video sections of the television receiver chassis. Although the embodiment in FIGURES 2–4 is described first, this is not to be construed in any way as a preference of the numerous forms and embodiments of this invention.

There is a casing 14 of ornamental shape in which a conventional small picture tube 16 is mounted. The casing has ventilation openings 20 in it, and a light funnel 24 at the front thereof mounted on vertical hinges 26. The light funnel is provided with a socket 28 at its apex, and there is a conventional projection lens barrel 30 adjustably disposed in the socket. Lens ring 32 is also located in the socket between the phosphor screen 34 of television receiver tubes 16 and the projection lens barrel 30. It is necessary for best performance that the light funnel 24 be attached in light-tight relationship to the open front of casing 14, and therefore there is a soft seal 36 at the juncture of the open inner end of funnel 24 and the stepped open front end of casing 14. A picture tube supporting ring 38 is bolted or otherwise secured in the open end of casing 14 to help support the picture tube. A number of conventional parts necessary for the operation of picture tube 14 are associated with the tube, these being only schematically represented. They are tube socket 42 attached to the tube base, ion trap 44 and the focusing magnet 46. Deflection yoke 48 is somewhat altered. It is supported adjustably by bracket 50, the latter being bolted or otherwise adjustably secured, for instance being located in a circular track in the casing 14, so that it may be in the normal position (FIGURE 3) or inverted with bracket 50 attached to the bottom or located at the bottom of casing 14 instead of at the top. This has the result of vertically inverting the image on the phosphor screen 34.

Cable 12 has a plurality of conductors 54 which are attached to the video section of the chassis. It also has a conductor 56 provided with a plug 58 at one end. The plug is attached to the audio section of the television chassis and extends into base 60 to connect with speaker 62 carried by the base. The base 60 has supporting feet 64 by which to rest it on a supporting surface, together with a cavity 66 in which speaker 62 is disposed behind grill 68 extending across the speaker opening in a wall of base 60. The audio conductor 56 is operatively connected to the speaker, and there is a conductor 70 extending to a switch-socket 72 that is carried by the base 60. Plug 74 at the end of a conductor 76 is adapted to be placed into switch-socket 72 in order to simultaneously discontinue the sound at speaker 62 and to energize the auxiliary or extension speaker 80 at the opposite end of conductor 76. Speaker 80 may be of any type, for instance the small speakers used under the pillow in hospitals, earphones or one or more full scale extension speakers to provide stereophonic effects or simply to provide sound in different areas.

There are means adjustably securing casing 14 to base 60. These means consist of a U-shape frame 84 (FIGURE 4) having sockets 86 and 88 at the upper ends thereof. Alined spindles 89 and 90 which are secured to the opposite sides of casing 14, are mounted for rotation in sockets 86 and 88. The outer ends of the spindles 89 and 90 are threaded, and there are knurled nuts 92 and 94 on the threaded ends of the spindles and in engagement with friction washers 95 and 96 disposed on the spindles and against the outer surfaces of the sockets 86 and 88 in order to hold the casing 14 in a selected position of adjustment when it is tilted about a longitudinal axis extending longitudinally through spindles 89 and 90.

A vertical spindle 98 is secured to the center of frame 84 and has a screw thread 200 thereon. Nut 102 is on the screw thread 100 and bears against the upper surface of sleeve 104 that is attached to base 60 in a counterbore of bore 106 thereon. Anti-friction thrust bearing 108 is lodged in sleeve 104 and rotationally seats spindle 98. The anti-friction bearing is pressed on or otherwise secured to the lower extremity of spindle 98 so that the spindle and the entire frame 84 including casing 14 supported by the frame, may be rotated about the longitudinal axis of spindle 98. However, when it is desired, nut 102 may be tightened down on sleeve 104 thereby locking the frame 84 and casing 104 in the selected adjusted position.

Cable 12 has the video section conductors 54 in it at the place where it passes through bore 106, a central open passage in spindle 98 and a lower opening 120 in casing 14. Among the video section wires there are horizontal deflection signal input wires 122 and 124 attached to terminals on deflection yoke 48. Control knob 126 (FIGURE 2) diagrammatically represents any controls which may be desired on base 60 and/or casing 14. The control knob, for instance, may be used for reducing or increasing the sound level. Other controls may be used for remotely operating chassis controls, for example brightness, contrast, horizontal linearity, etc. which would have an effect on the image appearing on phosphor screen 34 of the picture tube 16.

Reference is now made to FIGURE 1 illustrating a modification of FIGURES 2 through 4. The casing 14 is shown with a light funnel 130 that does not taper. Picture tube 16 is a small diameter tube of high light output intensity, and it is mounted on the open end of the casing 14 adjacent to the screen 34 of the picture tube 16. Conventional projection lens barrel 30 is adjustably mounted, for example by having a screw thread 31 in engagement with screw thread 33 on barrel 30 and in light funnel 130 respectively. This is so that the barrel may be adjusted with reference to the light source that is, the image appearing on the phosphor screen 34.

Figure 7:
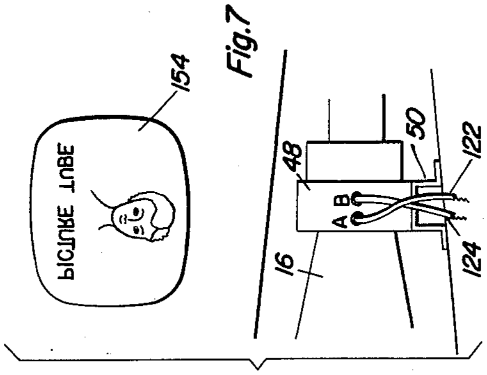
FIGURE 7 is a further diagrammatic view.
Figure 6:
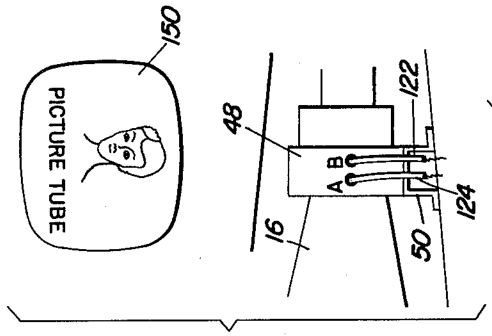
FIGURE 6 is another diagrammatic view.
Figure 5:
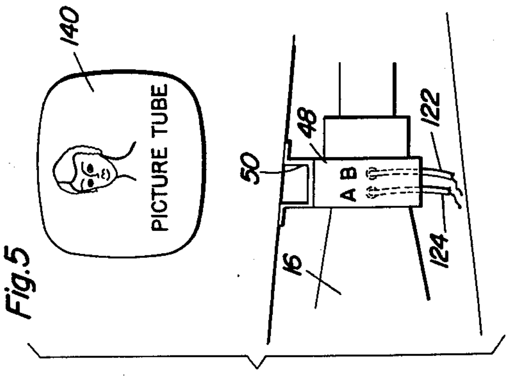
FIGURE 5 is a diagrammatic view to explain the operation of the television system.

The image on a television receiver tube phosphor screen cannot be projected onto a remote screen or other surface, e.g. a wall, because it will not be in the correct orientation. To use the system disclosed in FIGURE 1, then, adjustments are made in the television receiver. Viewing a picture tube directly without any image projection would produce an image 140 (FIGURE 5). In this case the picture tube 16 has its yoke 48 oriented properly that is, with the bracket attached to the upper part of the casing 14. The bracket 50 may, of course, be secured elsewhere, but it is merely used to identify one end of the approximately circular deflection yoke 48. In this position the horizontal deflection signal input wires 124 and 122 are attached at terminals A and B. Projecting with magnification using a conventional magnifying lens containing barrel 30 requires the image to be vertically inverted and horizontally inverted that is from left to right. Vertical inverting of the image is achieved by inverting the deflection yoke 48 (see FIGURE 6) producing an image 150. Horizontal inversion is achieved by exchanging the horizontal deflection signal input wires 122 and 124 so that wire 122 is attached to terminal A and wire 124 is attached to terminal B. This will produce an image 154 as shown in FIGURE 7. When such an image is magnified and projected onto a screen, it is correctly viewed.

When it is desired to use a lens system in addition to the magnification lens with the lens system of a smaller diameter than the picture tube, the funnel 24 (FIGURES 2 through 4) is required. This is used to concentrate the light and reduce the size of the image to a point where it will be reflected in a first lens 160 nearest to the projection lens 30 (FIGURE 3). This is a plano-convex lens which reduces the image in size in a short distance without varying the position of the image and transmits the image to the projection lens which in turn, is projected onto a screen of any type and of any size.

Figure 8:
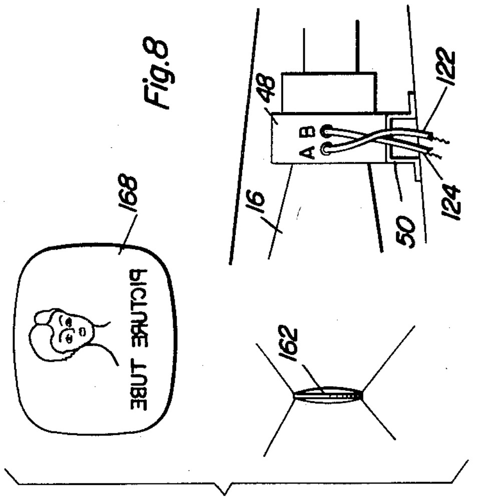
FIGURE 8 is another diagrammatic view.

When the use of a double convex lens 162 is desired, this functioning as a condenser lens, the yoke 48 is retained in its normal position (FIGURE 8) and horizontal deflection signal input wires 122 and 124 are exchanged from their normal position so that wire 122 is connected to terminal A and wire 124 is connected to terminal B. This produces an image 168 on the screen which is inverted only horizontally, this being suitable for projection through double convex lens 162, a magnification lens or lens system and then onto a screen surface.

In case it is desired to project an image through a translucent screen with a viewer on one side of the screen and the receiver-projector on the other side of the screen while using a double convex lens, the correct position of the image is obtained by inverting the deflection yoke (FIGURE 6) and leaving the horizontal signal input wires int heir normal position. The double convex lens such as lens 162 inverts the image and makes it possible to view the image from one side of the translucent screen in a proper orientation.

In instances where the receiver tube is designed to have an intense output, e.g. tubes 7NP4 or 5A2P4 ordinarily used for long range projection, a great deal of heat is generated at the tube. Such a tube 180 is fragmentarily shown in FIGURE 9. The invention is entirely compatible with such a tube with the following additional structure. The light funnel 182 is made large in cross-section in comparison to the tube diameter, and has an inturned wall 184 at its base. One or more apertures 185, constituting ventilation air inlets are in funnel, preferably wall 184 thereof. Light traps 186, e.g. the same type as used in photograph work and made of ducts with a group of baffles, are attached to wall 184 in a position to cover the apertures 185. The light traps 186 are modified to the extent of having filters 188, such as screens to exclude dust, dirt, etc. from the space enclosed by the funnel.

An air impeller 190 is attached to the front part of the funnel 182 and has its inlet connected with one or more openings in the front of the funnel to draw air from within the funnel. Air impeller is diagrammatically shown because it may be constructed in numerous ways. It is to be noted, though, that the location of the apertures 185 and impeller 190 is such that the air draft does not pass directly across the face of tube 180 since localized drafts or air carried impurities accidentally carried by the air may cause the hot tube to break.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a television system which includes a remote chassis, a picture tube, a casing in which said picture tube is mounted, a magnification lens, means mounting said magnification lens in front of the phosphor screen of said television receiver picture tube, said magnification lens also projecting the image appearing on the phosphor screen of the picture tube, means for inverting the image on the phosphor screen of the tube so that when magnified and projected it may be viewed in correct orientation, said lens mounting means including a light funnel having an outer end at which said lens is mounted, an inturned wall at the inner end of said funnel and receiving the face part of the picture tube, said wall having at least one ventilation aperture, and means connected with said funnel in advance of said ventilation aperture to propel ventilation air through the space enclosed by said funnel and in advance of the picture tube.

2. In a television system which includes a remote chassis, a picture tube, a casing in which said picture tube is mounted, a magnification lens, means mounting said magnification lens in front of the phosphor screen of said television receiver picture tube, said magnification lens also projecting the image appearing on the phosphor screen on the picture tube, means for inverting the image on the phosphor screen of the tube so that when magnified and projected it may be viewed in correct orientation, said lens mounting means including a light funnel having an outer end at which said lens is mounted, an inturned wall at the inner end of said funnel and receiving the face part of the picture tube, said wall having at least one ventilation aperture, means connected with said funnel in advance of said ventilation aperture to propel ventilation air through the space enclosed by said funnel and in advance of the picture tube, a light trap over said ventilation aperture, and a dust filter in registry with said light trap.

3. A portable independently mounted video and audio unit for television receivers or the like comprising, base means mounting sound producing means therein, casing means adjustably mounted by the base means, image producing means mounted in the casing means, flexible connecting means operatively connected to the sound producing means and an input end of the image producing means for respectively providing an audio and video signal thereto, magnifying lens means fixed to an output end of the image producing means, light confining passage means enclosing one end of the casing means for directing light from the output end of the image producing means, and variable projection lens means mounted at one end of the passage means remote from the casing means for receiving directed and confined light from the image producing means for projection of an image therefrom on a screen.

4. The combination of claim 3, including airflow inducing means disposed in the light confining passage means operative to induce airflow therein parallel to the image producing means for withdrawal of heat therefrom.

References Cited in the file of this patent

UNITED STATES PATENTS

| | | |
|---|---|---|
| 2,236,578 | Parker | Apr. 1, 1941 |
| 2,287,307 | Herbst | June 23, 1942 |
| 2,315,113 | Farnsworth | Mar. 30, 1943 |
| 2,647,255 | Jansen | July 28, 1953 |

FOREIGN PATENTS

| | | |
|---|---|---|
| 961,663 | France | May 17, 1950 |
| 552,476 | Italy | Dec. 3, 1956 |